United States Patent
Liu et al.

(10) Patent No.: US 10,114,420 B2
(45) Date of Patent: Oct. 30, 2018

(54) FLEXIBLE SCREEN EXTENSION STRUCTURE, FLEXIBLE SCREEN ASSEMBLY, AND TERMINAL

(71) Applicant: SHENZHEN ROYOLE TECHNOLOGIES CO. LTD., Shenzhen (CN)

(72) Inventors: Zihong Liu, Shenzhen (CN); Xiang Zou, Shenzhen (CN); Songling Yang, Shenzhen (CN)

(73) Assignee: SHENZHEN ROYOLE TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/538,483

(22) PCT Filed: Dec. 23, 2014

(86) PCT No.: PCT/CN2014/094601
§ 371 (c)(1),
(2) Date: Jun. 21, 2017

(87) PCT Pub. No.: WO2016/101123
PCT Pub. Date: Jun. 30, 2016

(65) Prior Publication Data
US 2017/0371371 A1    Dec. 28, 2017

(51) Int. Cl.
*G06F 1/16*    (2006.01)
*G09F 9/30*    (2006.01)
*H04M 1/02*    (2006.01)

(52) U.S. Cl.
CPC .............. *G06F 1/1652* (2013.01); *G06F 1/16* (2013.01); *G06F 1/1616* (2013.01);
(Continued)

(58) Field of Classification Search
CPC ..... G06F 1/1624; G06F 1/1652; G06F 1/1615
(Continued)

(56) References Cited

U.S. PATENT DOCUMENTS 5,675,687 A * 10/1997 Wood .................... G06F 1/1616
385/115
7,787,919 B2 * 8/2010 Hsieh .................... G06F 1/1624
361/679.55
(Continued)

FOREIGN PATENT DOCUMENTS

CN    102622053 A    8/2012
JP    2002-99226 A    4/2002
(Continued)

*Primary Examiner* — Nidhi Thaker
(74) *Attorney, Agent, or Firm* — Hauptman Ham, LLP

(57) ABSTRACT

Disclosed are a flexible screen extension structure, a flexible screen assembly, and a terminal. The flexible screen extension structure may include a first panel, a first sliding element, a second panel, a second sliding element, and a first elastic element. The first panel may include a first guiding mechanism. The first sliding element is slidably connected to the first guiding mechanism along a first direction. The second panel may include a second guiding mechanism. The second sliding element is slidably connected to the second guiding mechanism along a second direction. The second direction is parallel to the first direction. The first elastic element is arranged between the first sliding element and the second sliding element.

20 Claims, 9 Drawing Sheets

(52) U.S. Cl.
CPC .......... *G06F 1/1624* (2013.01); *G06F 1/1626* (2013.01); *G09F 9/301* (2013.01); *H04M 1/0268* (2013.01); *G06F 1/1643* (2013.01); *H05K 999/99* (2013.01)

(58) Field of Classification Search
USPC ............ 361/679.27, 679.26, 679.55, 679.56; 455/575.1, 575.4; 345/1.1, 1.3
See application file for complete search history.

(56) References Cited

U.S. PATENT DOCUMENTS

| | | | | |
|---|---|---|---|---|
| 7,991,442 | B2* | 8/2011 | Kim | ...................... G06F 1/1616 455/575.1 |
| 8,630,085 | B2* | 1/2014 | Sawada | ............... H04M 1/0237 345/169 |
| 2009/0009423 | A1* | 1/2009 | Huang | .................. G06F 1/1601 345/1.1 |
| 2012/0212433 | A1* | 8/2012 | Lee | ....................... G06F 1/1652 345/173 |
| 2012/0274570 | A1* | 11/2012 | Kim | .................... H04M 1/0237 345/168 |
| 2012/0314400 | A1 | 12/2012 | Bohn | |
| 2014/0026368 | A1* | 1/2014 | Katsuta | ................. G06F 1/1624 16/362 |
| 2014/0194165 | A1* | 7/2014 | Hwang | ................. G06F 1/1677 455/566 |

FOREIGN PATENT DOCUMENTS

| | | |
|---|---|---|
| JP | 2010-54977 A | 3/2010 |
| JP | 2012-513033 A | 6/2012 |
| JP | 2013-192082 A | 9/2013 |
| WO | WO 2008140308 A1 * 11/2008 | .......... G06F 1/1613 |
| WO | 2012132000 A1 | 10/2012 |

* cited by examiner

FLEXIBLE SCREEN EXTENSION STRUCTURE, FLEXIBLE SCREEN ASSEMBLY, AND TERMINAL

TECHNICAL FIELD

The present disclosure relates to the field of display device, and particularly to a flexible screen extension structure, a flexible screen assembly, and a terminal.

BACKGROUND ART

Current terminal display devices have an increasingly strict requirement for the display size. Typical display devices are often restricted by the screen size, and there is usually a problem that a display device with a large screen cannot realize portability, for example, the display size of a tablet computer can meet the requirement, while the tablet computer usually needs to be placed in a computer bag, and cannot be placed in a pocket as a mobile phone. However, a display device which can realize portability cannot realize a large enough display size, for example, the mobile phone can be placed in a pocket very easily, but it is impossible to provide a very large display size for the mobile phone. Therefore, there is an urgent need for a display device which not only can realize a large enough screen size but also is portable.

SUMMARY

The present disclosure aims to provide a flexible screen extension structure, a flexible screen assembly, and a terminal, realizing large display size and also portability.

To solve the above technical problems, the present disclosure provides a flexible screen extension structure. The flexible screen extension structure may include a first panel, a first sliding element, a second panel, a second sliding element, and a first elastic element. The first panel may include a first guiding mechanism. The first sliding element is slidably connected to the first guiding mechanism along a first direction, and under the guide of the first guiding mechanism, the first sliding element can be slid to a first position where the first sliding element is overlapped with the first panel, and to a second position where the first sliding element is at least partially misaligned with respect to the first panel. The second panel may include a second guiding mechanism. The second sliding element is slidably connected to the second guiding mechanism along a second direction, and under the guide of the second guiding mechanism, the second sliding element can be slid with respect to the second panel to a third position where the second sliding element is adjacent to the first panel, and to a fourth position where the second sliding element is far away from the first panel. The second direction is parallel to the first direction. The first elastic element is arranged between the first sliding element and the second sliding element.

When the first sliding element is located in the first position and the second sliding element is located in the fourth position, the first panel and the second panel are overlapped with each other, and the first elastic element provides an elastic force to cause the first sliding element and the second sliding element to get close to each other in a direction from the first panel to the second panel. When the first sliding element is located in the second position and the second sliding element is located in the third position, the first panel and the second panel are kept side by side under the effect of the elastic force.

The present disclosure further provides a flexible screen assembly. The flexible screen assembly may include any of the above flexible screen extension structures. The flexible screen assembly may further include a flexible screen. The flexible screen comprises a first edge, and a second edge opposite to the first edge. The first edge is fixed to the first panel, and the second edge is fixed to the second panel.

The present disclosure further provides a terminal. The terminal may include the above flexible screen assembly. The terminal may further include a battery, a signal input device, and a central processing unit. All of the battery, the signal input device, and the central processing unit are mounted in the flexible screen assembly. The signal input device is electrically coupled to the central processing unit for receiving a signal and transmitting the signal to the central processing unit. The flexible screen assembly is electrically coupled to the central processing unit for acquiring a signal from the central processing unit and outputting the signal. The central processing unit is configured to acquire a signal from the signal input device, process the signal, and transmit the processed signal to a signal output device. The battery supplies power to the central processing unit, the flexible screen assembly, and the signal input device.

For the flexible screen extension structure, the flexible screen assembly, and the terminal of the present disclosure, by means of that the first sliding element can be slid to the first position or the second position, and that the second sliding element can also be slid to the third position or the fourth position, and by means of that the first elastic element can cause the first sliding element and the second sliding element to get close to each other, the first panel can be stacked on the second panel, realizing reduction of the size of a display device, and portability, and it can be also realized that the first panel and the second panel are flush with each other and arranged side by side, thereby increasing the size of the display device, and realizing increase of the display size.

BRIEF DESCRIPTION OF THE DRAWINGS

In order to illustrate the technical solutions of embodiments of the present disclosure more clearly, the accompanying drawings used in the description of the embodiments will be briefly described. Apparently, the accompanying drawings described in the following are some embodiments of the present disclosure, and a person skilled in the art can obtain other accompanying drawings without any creative effort.

DETAILED DESCRIPTION

Below technical solutions of embodiments of the present disclosure will be described clearly and completely in conjunction with the accompanying drawings of the embodiments of the present disclosure.

Figure 1:
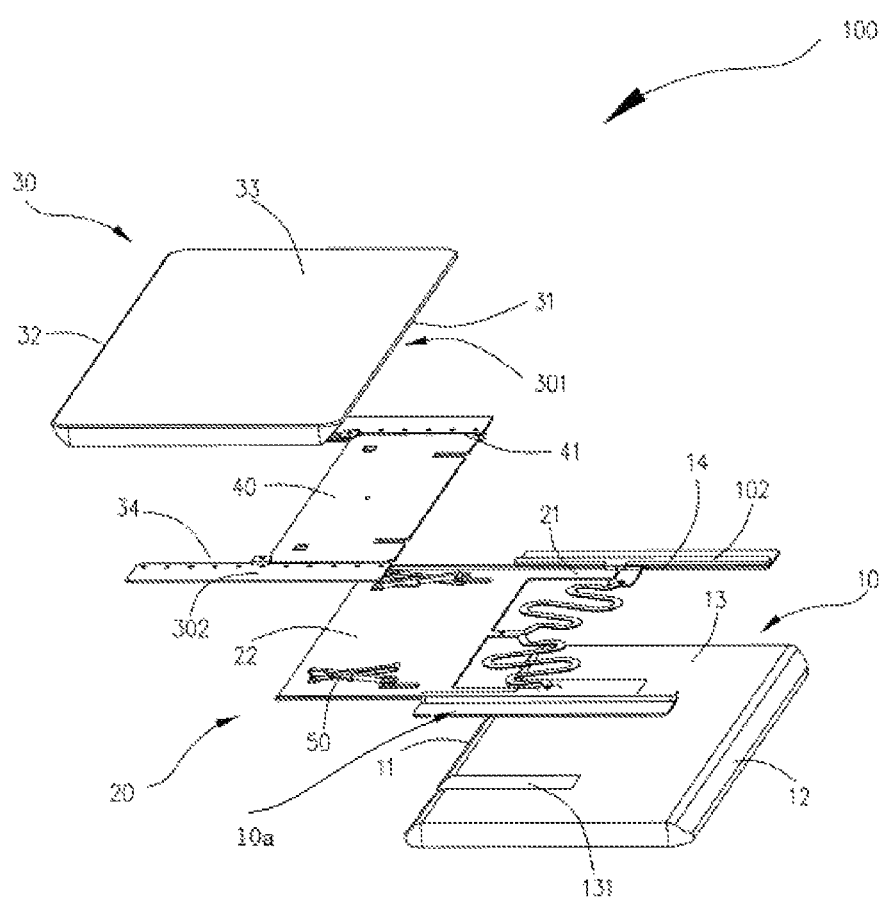
FIG. 1 is an exploded schematic view of a flexible screen extension structure of a first embodiment.
Figure 2:
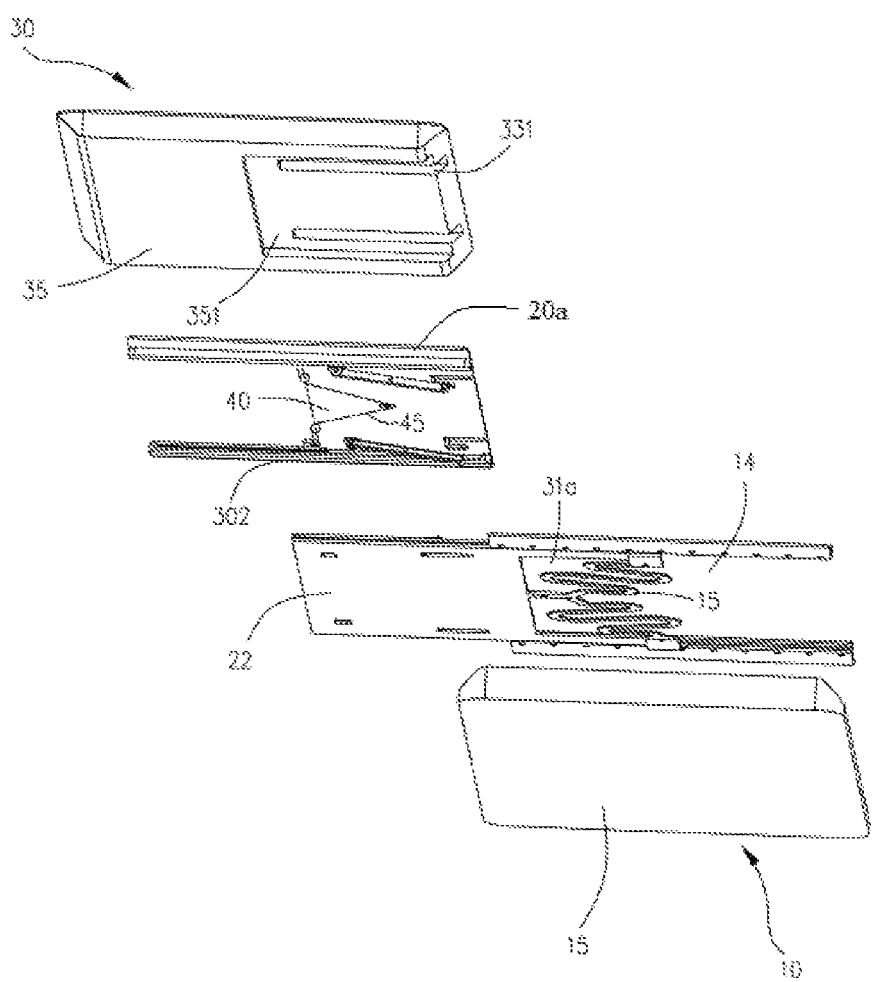
FIG. 2 is an exploded schematic view of the flexible screen extension assembly of FIG. 1, viewed from another view point.
Figure 3:
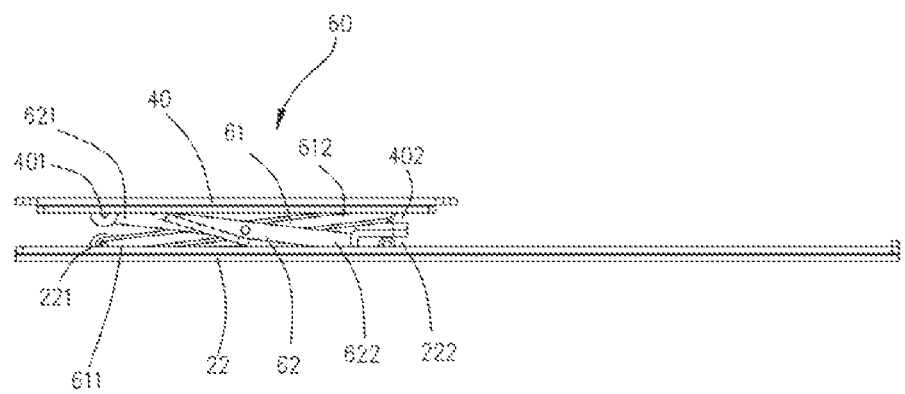
FIG. 3 is an assembled schematic view of a first sliding element and a second sliding element of the flexible screen extension structure of FIG. 1.

Referring to FIG. 1, FIG. 2, and FIG. 3, an embodiment of the present disclosure provides a flexible screen extension structure 100. The flexible screen extension structure 100 includes a first panel 10, a first sliding element 20, a second panel 30, a second sliding element 40, and a first elastic element 50. The first panel 10 includes a first guiding mechanism 10a. The first sliding element 20 is slidably connected to the first guiding mechanism 10a along a first direction, and under the guide of the first guiding mechanism 10a, the first sliding element 20 can be slid to a first position where the first sliding element 20 is overlapped with the first panel 10, and to a second position where the first sliding element 20 is at least partially misaligned with respect to the first panel 10. The second panel 30 includes a second guiding mechanism 20a. The second sliding element 40 is slidably connected to the second guiding mechanism 20a along a second direction, and under the guide of the second guiding mechanism 20a, the second sliding element 40 can be slid to a third position where the second sliding element 40 is adjacent to the first panel 10, and to a fourth position where the second sliding element 40 is far away from the first panel 10. The second direction is parallel to the first direction. The first elastic element 50 is arranged between the first sliding element 20 and the second sliding element 40.

When the first sliding element 20 is located in the first position and the second sliding element 40 is located in the fourth position, the first panel 10 and the second panel 30 are overlapped with each other, and the first elastic element 50 provides an elastic force to cause the first sliding element 20 and the second sliding element 40 to get close to each other in a direction from the first panel 10 to the second panel 30. When the first sliding element 20 is located in the second position and the second sliding element 40 is located in the third position, the first panel 10 and the second panel 30 are kept side by side under the effect of the elastic force.

By means of that the first sliding element 20 can be slid to the first position or the second position, and that the second sliding element 40 can be also slid to the third position or the fourth position, and by means of that the first elastic element 50 can cause the first sliding element 20 and the second sliding element 40 to get close to each other, the first panel 10 can be stacked on the second panel 30, realizing reduction of the size of a display device, and portability. Furthermore, it can also be realized that the first panel 10 and the second panel 30 are flush with each other and arranged side by side, thereby increasing the size of the display device, and realizing increase of the display size.

It can be understood that both the first panel 10 and the second panel 30 can be used as supporting devices of a flexible screen, and both the first panel 10 and the second panel 30 can be overlapped with the flexible screen, so that fixing the shape of the flexible screen can be realized, and performing touch operations on the flexile screen can be realized. Alternatively, when the first panel 10 and the second panel 30 are arranged side by side, the flexible screen can be unfolded on the first panel 10 and the second panel 30, presenting a flat panel display screen structure.

In the embodiment, the first guiding mechanism 10a may be a sliding slot defined in the first panel 10, also may be a guiding rail provided on the first panel 10, and also may be an insertion slot or an insertion hole defined in the first panel 10. The first guiding mechanism 10a can guide the first sliding element 20 to slide relative to the first panel 10 along the first direction. The first direction is parallel to a surface of the first panel 10 supporting the flexible screen. When the first sliding element 20 is in the first position, the first guiding mechanism 10a can guide the first sliding element 20 to expand the supporting surface of the first panel 10.

In the embodiment, the second guiding mechanism 20a may be a sliding slot defined in the second panel 30, also may be a guiding rail provided on the second panel 30, and also may be an insertion slot or an insertion hole defined in the second panel 30. The second guiding mechanism 20a can guide the second sliding element 40 to slide relative to the second panel 30 along the second direction. The second direction is parallel to a surface of the second panel 30 supporting the flexible screen. Since the second direction is parallel to the first direction, i.e., the second panel 30 can be slid relative to the first panel 10, the second panel 30 and the first panel 10 may be overlapped with each other or may be staggered from each other. That is, the second guiding mechanism 20a can guide the second sliding element 40 to slide relative to the second panel 30, and also guide the second panel 30 to slide relative to the first panel 10.

In the embodiment, a first embodiment is provided. The first panel 10 includes a first inner side surface 11, a first outer side surface 12 arranged opposite to the first inner side surface 11, and a first upper surface 13 arranged between the first inner side surface 11 and the first outer side surface 12. The first panel 10 further includes a first sliding slot 14 defined in a side facing away from the first upper surface 13. The first sliding slot 14 extends from the first inner side surface 11 to the first outer side surface 12. The extending direction of the first sliding slot 14 is parallel to the first upper surface 13.

The first sliding element 20 includes a connecting portion 21 and a supporting portion 22. The connecting portion 21 is slidably connected to the first sliding slot 14. The supporting portion 22 is fixed to a side of the connecting portion 21, and can be slid into or out of the first sliding slot 14.

The second sliding element 40 is arranged opposite to the supporting portion 22, located at a side of the first sliding element 20 away from the first upper surface 13, and can get away from or approach the first sliding element 20 along a direction perpendicular to the first upper surface 13.

The first elastic element 50 is connected between xe supporting portion 22 and the second sliding element 30, and is configured to provide a restoring force to cause the second sliding element 40 to approach the supporting portion 22.

The second panel 30 includes a second inner side surface 31, a second outer side surface 32 arranged opposite to the second inner side surface 31, and a second upper surface 33 arranged between the second inner side surface 31 and the second outer side surface 32. The second upper surface 33 is parallel to the first upper surface 13. The second panel 40 further includes a second sliding slot 14 defined in a side facing away from the second upper surface 33. The second sliding slot 34 extends from the second inner side surface 41 to the second outer side surface 42. The extending direction of the second sliding slot 34 is parallel to that of the first sliding slot 14. The second sliding element 40 is slidably connected to the second sliding slot 34.

When the supporting portion 22 is slid out of the first sliding slot 14, the supporting portion 22 and the first panel 10 are misaligned. That is, the first sliding element 20 is slid to the second position, and approaches the second sliding element 40 under the effect of the elastic force of the first elastic element 50, and meanwhile the second sliding element 40 is slid to approach the second inner side surface 31 of the second panel 30, that is, the second sliding element 40 is slid to a position where the second panel 30 is close to the first panel 10. That is, when the second sliding element 40 is slid to the third position, the second panel 30 can be unfolded with respect to the first panel 10, that is, the second panel 30 and the first panel 10 are arranged side by side. The second inner side surface 31 may fit with the inner side surface 11, and the second upper surface 33 is flush with the first upper surface 13.

When the supporting portion 22 is slid into the first sliding slot 14, the supporting portion 22 is overlapped with the first panel 10, that is, the first sliding element 20 is slid to the first position, and the second sliding element 40 is slid to approach the second outer side surface 32 of the second panel 30, that is, the second sliding element 40 is slid to a position where the second panel 30 is away from the first panel 10. That is, when the second sliding element 40 is slid to the fourth position, the second sliding element 40 is overlapped with the first panel 10, thus the second panel 30 and the first panel 10 are overlapped with each other.

In the embodiment, the first panel 10 is a rectangular plate. Specifically, the first panel 10 is a housing, and the first panel 10 is hollow to define a first receiving cavity (not shown). An opening end of the first receiving cavity is defined on the first inner side surface 11 so that the first sliding element 20 can be received in the first receiving cavity through the opening end. Two first slide guiding strips 102 are received in the first receiving cavity. The first slide guiding strips 102 are fixed to an inner surface of the first receiving cavity, and extend from the first inner side surface 11 to the first outer side surface 12. The first sliding slot 14 is provided between the two first slide guiding strips 102, and an insertion opening (not shown) of the first sliding slot 14 is defined on the first inner side surface 11. It can be understood that the first sliding element 20 can be inserted into the first sliding slot 14 through the opening end of the first receiving cavity. In other embodiments, the first sliding slot 14 also may be a through hole extending through the first inner side surface 11 and the first outer side surface 12.

In the embodiment, the first sliding element 20 is a rectangular plate, and the first sliding element 20 is parallel to the first upper surface 13. When the first sliding element 20 is slid to the first position, the first sliding element 20 is located between the first inner side surface 11 and the first outer side surface 12. When the first sliding element 20 is slid to the second position, at least a part of the first sliding element 20 is located at a side of the first inner side surface 11 facing away from the first outer side surface 12. Specifically, the first sliding element 20 can be inserted into the first sliding slot 14, and the connecting portion 21 and the supporting portion 22 are integrally formed. When the connecting portion 21 gets away from the insertion opening of the first sliding slot 14, the supporting portion 22 is slid into the first sliding slot 14 and is adjacent to the insertion opening of the first sliding slot 14, i.e. adjacent to the first inner side surface 11. When the connecting portion 21 gets close to the insertion opening of the first sliding slot 14, the supporting portion 22 is slid out of the first sliding slot 14. In other embodiments, the first sliding element also may be a rod element, and the connecting portion and the supporting portion are respectively provided on two ends of the first sliding element.

In the embodiment, the second sliding element 40 is a rectangular plate, the second sliding element 40 is parallel to the first sliding element 40, and the second sliding element 40 together with the first sliding element 20 can be slid relative to the first panel 10. When the supporting portion 22 is located in the first sliding slot 14, and meanwhile a force is applied to the second panel 30 to cause the second panel 30 to get away from the supporting portion 22 in a direction perpendicular to the second panel 30, the second panel 30 is stacked on the first upper surface 13. When the supporting portion 22 is slid out of the first sliding slot 14, and meanwhile the second sliding element 40 approaches the supporting portion 40 under the effect of the elastic force of the first elastic element 50, the second sliding element 40 is located at a side of the first inner side surface 11 facing away from the first outer side surface 12, the second sliding element 40 drives the second panel 30 to get close to the first panel 10 in the direction perpendicular to the second panel 30, and finally the second panel 30 and the first panel 10 are arranged side by side. In other embodiments, the second sliding element also may be a rod element, and the second sliding element also may be a sliding block.

In the embodiment, the first elastic element 50 may be a rectangular spring, also may be a torsion spring, and also may be an irregular spring. Specifically, the first elastic element 50 is a torsion spring, and the first elastic element 50 is in a deformed state to cause the second sliding element 40 to abut against the supporting portion 22. An external force needs to be applied to the second sliding element 40 or the first sliding element 20 to cause the second sliding element 40 to get away from the first sliding element 20. After the external force is removed, the second sliding element 40 approaches the first sliding element 20 under the effect of the restoring force of the first elastic element 50. In other embodiments, the first elastic element also may be a rectangular spring sleeved on a telescopic rod, and the telescopic rod is connected between the second sliding element and the supporting portion.

Figure 5:
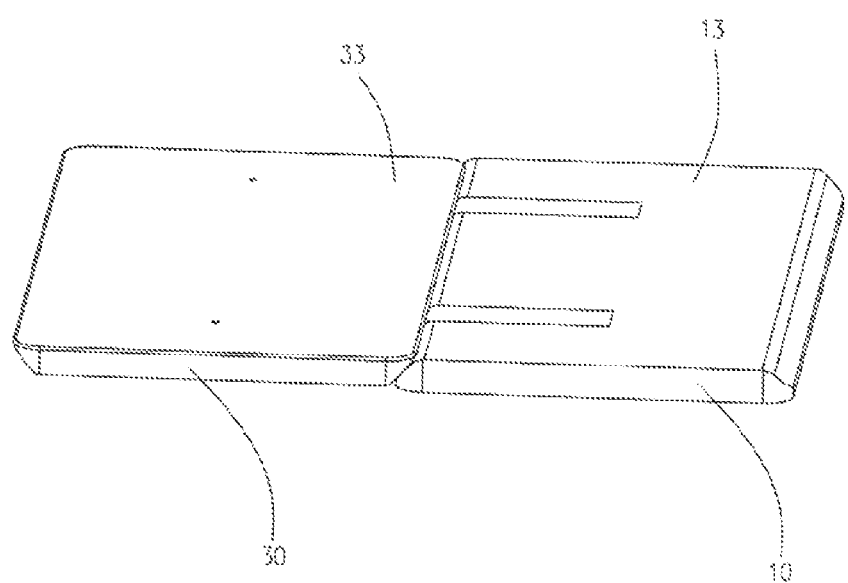
FIG. 5 is a schematic view showing a first panel of the flexible screen extension structure of FIG. 1 unfolded with respect to a second panel of the flexible screen extension structure of FIG. 1.
Figure 6:
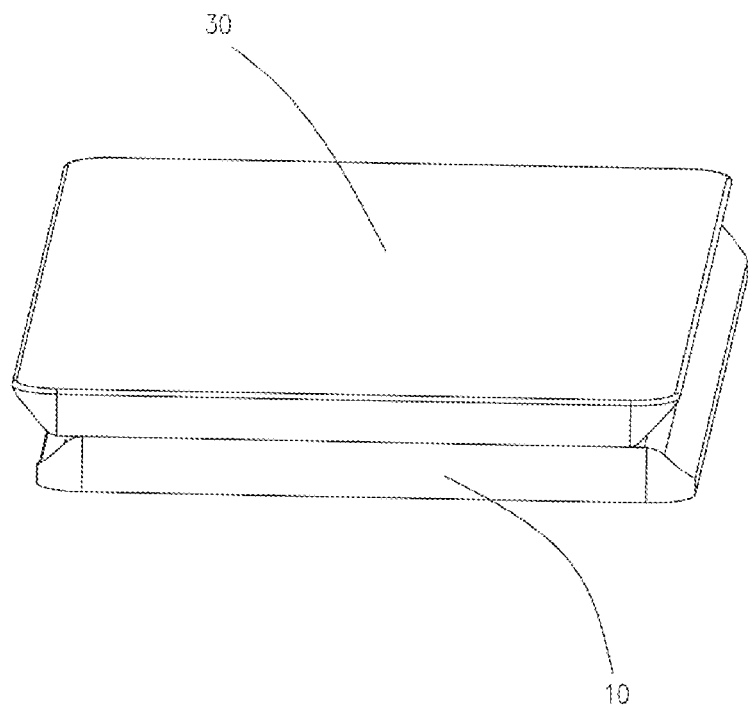
FIG. 6 is a schematic view showing the first panel of the flexible screen extension structure of FIG. 1 overlapped with the second panel of the flexible screen extension structure of FIG. 1.

In the embodiment, the second panel 30 is a rectangular plate, and the shape of the second panel 30 is equivalent to the first panel 10. The third position and the fourth position are provided between the second inner side surface 31 and the second outer side surface 32. The third position is adjacent to the second inner side surface 31, and the fourth position is adjacent to the second outer side surface 32. The second panel 30 is parallel to the first panel 10. Specifically, the second panel 30 is a housing, and the second panel 30 is hollow to define a second receiving cavity 301. An opening end of the second receiving cavity 301 is defined on the second inner side surface 31 so that the second sliding element 40 can be received in the second receiving cavity 301 through the opening end. Two second slide guiding strips 302 are received in the second receiving cavity 301, and the second slide guiding strips 302 are fixed to an inner surface of the second receiving cavity 301 to extend from the second inner side surface 31 to the second outer side surface 32. The second sliding slot 34 is provided between the two second slide guiding strips 302, and the second sliding element 40 can be slid back and forth between the second inner side surface 31 and the second outer side surface 32. When the second sliding element 40 gets close to the second inner side surface 31, i.e., the second sliding element 40 is slid to the third position, and meanwhile the second sliding element 40 approaches the supporting portion 22 of the first sliding element 20 under the effect of the elastic force of the first elastic element 50, the second panel 30 is located at a side of the first inner side surface 11 facing away from the first outer side surface 12, and the second upper surface 33 is flush with the first upper surface 13, as shown in FIG. 5. When the second sliding element 40 gets close to the second outer side surface 42, i.e., the second sliding element 40 is slid to the fourth position, the second inner side surface 31 of the second panel 30 is located in a position where the first upper surface 13 is adjacent to the first inner side surface 11, and the supporting portion 22 of the first sliding element 20 is slid into the first sliding slot 14, thus the first upper surface 13 of the first panel 10 and a surface of the second panel 40 facing away from the second upper surface 43 are overlapped with each other, as shown in FIG. 6. It can be understood that the second panel 30 may be formed by an upper cover plate and a bottom cover plate. The second receiving cavity 301 may be provided between the two cover plates. By means of separating the two cover plates, mounting the second slide guiding trips 302 can be realized, and inserting the second sliding element 40 into the second sliding slot 34 can be realized. In other embodiment, the second sliding slot 34 may also be a through hole extending through the second inner side surface 31 and the second outer side surface 32.

Furthermore, in the embodiment, the first panel 10 further includes a first bottom surface 15 arranged opposite to the first upper surface 13. The second panel 30 further includes a second bottom surface 35 arranged opposite to the second upper surface 33. The second bottom surface 35 defines a groove 351. The supporting portion 22 of the first sliding element 20 is slid out of the first sliding slot 14, i.e., the first sliding element 20 is at least partially slid out of the first sliding slot 14, and the supporting portion 22 of the first sliding element 20 is received in the groove 351. The first upper surface 13 is flush with the second upper surface 43, and the second bottom surface 15 is flush with the second bottom surface 35.

In the embodiment, the thickness of the first panel 10 is equivalent to that of the second panel 30. When the supporting portion 22 of the first sliding element 20 is slid out of the first sliding slot 14, the second sliding element 40 approaches the supporting portion 22 of the first sliding element 20, and the second panel 30 and the first panel 10 are arranged side by side. By means of that the supporting portion 22 of the first sliding element 20 is received in the groove 351, and that the first bottom surface 15 is flush with the second bottom surface 35, the first panel 10 and the second panel 30 can be arranged side by side into a plate with a flat surface, so that a supporting device of the flexible screen can have a bigger dimension, and the flexible screen also can be placed on the supporting device in a flat manner.

Figure 7:
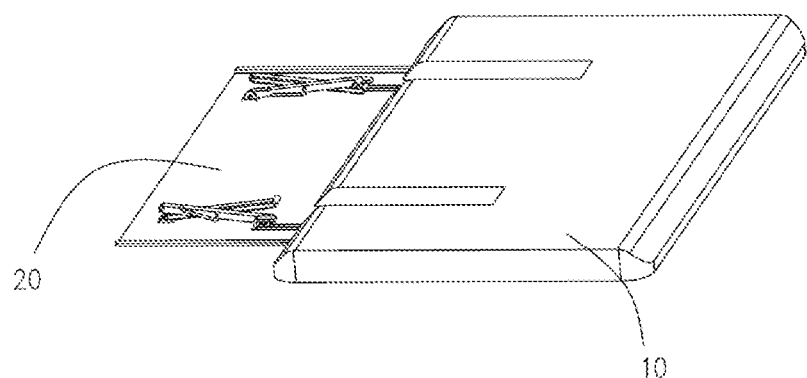
FIG. 7 is a schematic view showing the first sliding element of the flexible screen extension structure of FIG. 1 slid to a second position with respect to the first panel.
Figure 8:
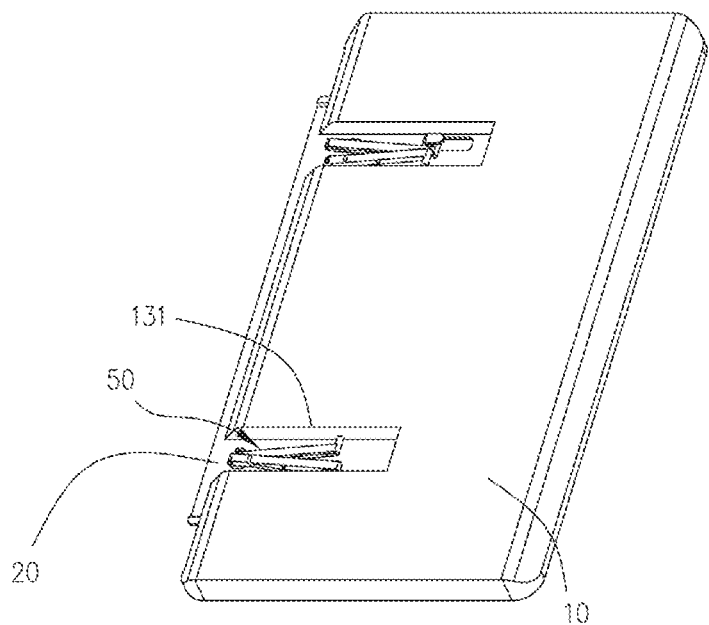
FIG. 8 is a schematic view showing the first sliding element of the flexible screen extension structure of FIG. 1 slid to a first position with respect to the first panel.
Figure 9:
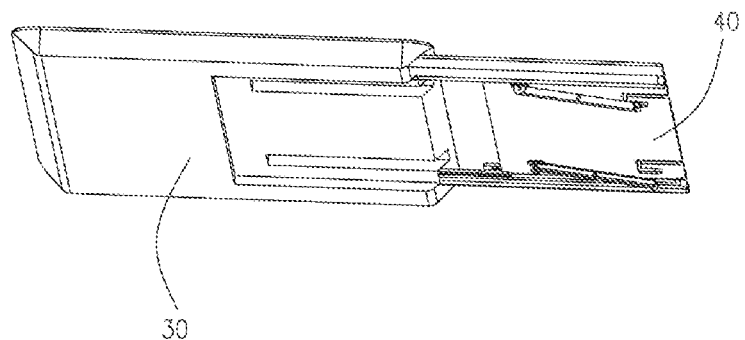
FIG. 9 is an assembled schematic view of the second sliding element and the second panel of the flexible screen extension structure of FIG. 1.

Furthermore, referring to FIG. 7, FIG. 8, and FIG. 9, in the embodiment, the first upper surface 13 of the first panel 10 defines a first guiding slot 131 extending through the first sliding slot 14, and the first guiding slot 131 extends along a direction parallel to the first panel 10. The supporting portion 22 of the first sliding element 20 is slid into the first sliding slot 14, and an end of the first elastic element 50 adjacent to the first sliding element 20 is slidably connected to the first guiding slot 131. The second panel 30 defines a second guiding slot 331. The second guiding slot 331 extends along a direction parallel to the second panel 30, and an end of the first elastic element 50 adjacent to the second sliding element 40 is slidably connected to the second guiding slot 331. Specifically, the second guiding slot 331 extends through the groove 351. When the second panel 30 is slid with respect to the first panel 10, the end of the first elastic element 50 adjacent to the second sliding element 40 is slidably connected to the second guiding slot 331.

In the embodiment, the extending direction of the first guiding slot 131 is parallel to the sliding direction of the first sliding element 20, and an opening (not shown) of the first guiding slot 131 is defined on the first inner side surface 11. The end of the first elastic element 50 adjacent to the first sliding element 20 is slid into or out of the first guiding slot 131 through the opening, thus the first sliding element 20 is enabled to slide smoothly. Likewise, the extending direction of the second guiding slot 331 is parallel to the sliding direction of the second sliding element 40, an opening of the second guiding slot 331 is defined on the second inner side surface 31, and the first elastic element 50 is slide into the second guiding slot 331 through the opening. It can be understood that the second guiding slot 331 may be provided with a limiting portion (not shown) at a position away from the second inner side surface 31. When the first elastic element 50 is slid along the second guiding slot 331 and abuts against the limiting portion, the limiting portion pushes the second panel 30 to move towards the first outer side surface 12 of the first panel 10, then the limiting portion pushes the first elastic element 50 to move towards the first outer side surface 12, thereby driving the first sliding element 20 to slide into the first sliding slot 14. Thus, it is convenient to stack the first panel 10 and the second panel 30, so that the flexible screen extension structure 100 saves labor and has a stable structure.

Furthermore, an included angle between the first inner side surface 11 and the first upper surface 13 is an obtuse angle. The second inner side surface 31 is parallel to the first inner side surface 11. The second inner side surface 31 can abut against the first inner side surface 11, and the second inner side surface 31 and the first inner side surface 11 can be slid in relation to each other, causing the first upper surface 33 to be flush with the second upper surface 43.

In the embodiment, when the first sliding element 20 is slid to the second position, i.e., the supporting portion 22 is slid out of the first sliding slot 14, the second inner side surface 31 of the second panel 30 is slid on the first upper surface 13 towards an edge of the first inner side surface 11. When the first sliding element 20 is slid to the second position, the second inner side surface 31 is slid to the edge of the first inner side surface 11. Since the included angle between the first inner side surface 11 and the first upper surface 13 is an obtuse angle, and also the second inner side surface 31 is parallel to the first inner side surface 11, the second inner side surface 31 can be automatically slid with respect to the first inner side surface 11 under the force of the first elastic element 50, so that the second upper surface 33 can get close to the first upper surface 13, and finally the second upper surface 33 is flush with the first upper surface 13, thus the flexible screen extension structure 100 saves labor and has a stable structure.

Figure 4:
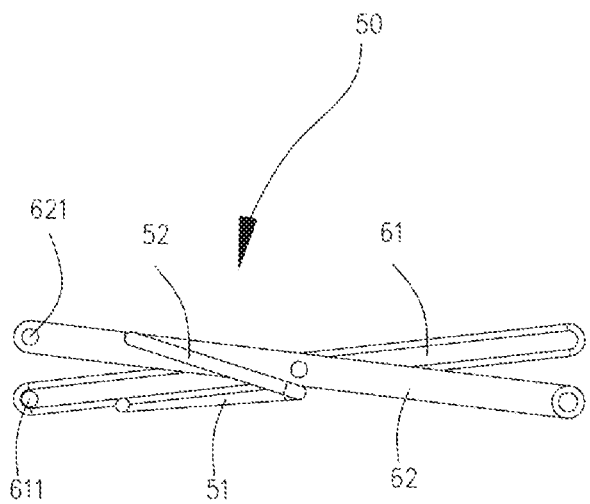
FIG. 4 is a schematic view of a first elastic element of the flexible screen extension structure of FIG. 1.

Furthermore, referring to FIG. 3 and FIG. 4, the flexible screen extension structure 100 includes a third guiding mechanism 60. The third guiding mechanism 60 is connected between the first sliding element 20 and the second sliding element 40, so that the first sliding element 20 and the second sliding element 30 can be slid in relation to each other in a direction perpendicular to the first panel 10.

In the embodiment, the third guiding mechanism 60 includes a first rocking bar 61, and a second rocking bar 62. The first rocking bar 61 includes a first rotation end 611, and a first sliding end 612 arranged opposite to the first rotation end 611. The first rotation end 611 is rotatably connected to the supporting portion 22 of the first sliding element 20, the first sliding end 612 is slidably connected to the second sliding element 40, and a rotation surface of the first rocking bar 61 is perpendicular to the first upper surface 13. The second rocking bar 62 includes a second rotation end 621, and a second sliding end 622 arranged opposite to the second rotation end 621. The second rotation end 621 is rotatably connected to the second sliding element 40, and is arranged opposite to the first rotation end 611. The second sliding end 622 is slidably connected to the supporting portion 22 of the first sliding element 20, and is arranged opposite to the first sliding end 612. A rotation surface of the second rocking bar 62 is parallel to that of the first rocking bar 61.

In the embodiment, a side of the supporting portion 22 of the first sliding element 20 facing away from the first bottom surface 15 is provided with a first rotation shaft 221 and a first clamping groove 222. The axial direction of the first rotation shaft 221 is parallel to the first panel 10, and is perpendicular to the sliding direction of the first sliding element 20. The first rotation end 611 of the first rocking bar 61 is rotatably connected to the first rotation shaft 221. The first clamping groove 222 is arranged at a side of the first rotation shaft 221. The extending direction of the first clamping groove 222 is parallel to the sliding direction of the first sliding element 20, and is located within the rotation surface of the first rocking bar 61. The second sliding end 622 is slidably connected to the first clamping groove 222. A side of the second sliding element 40 facing away from the second upper surface 33 is provided with a second rotation shaft 401 and a second clamping groove 402. The axial direction of the second rotation shaft 401 is parallel to the second panel 30, and is perpendicular to the sliding direction of the second sliding element 40. The second rotation end 621 of the second rocking bar 62 is rotatably connected to the second rotation shaft 401. The second clamping groove 402 is arranged at a side of the second rotation shaft 401. The extending direction of the second clamping groove 402 is parallel to the sliding direction of the second sliding element 40, and is located within the rotation surface of the second rocking bar 62. The first sliding end 612 is slidably connected to the second clamping groove 402. By means of that the first rocking bar 61 and the second rocking bar 62 are rotated around the first rotation shaft 221 and the second rotation shaft 401 respectively, and that the first sliding end 612 and the second sliding end 622 are slid in the second clamping groove 402 and the first clamping groove 221 respectively, the sliding direction of the first sliding element 20 relative to the second sliding element 40 is perpendicular to the first panel 10. The first rocking bar 61 and the second rocking bar 62 serve a function of guiding the first sliding element 20 and the second sliding element 40, so that the structure of the flexible screen extension structure 100 is more stable. In other embodiments, the first sliding element 20 also may define a guiding hole, and the second sliding element 40 may be provided with a guiding post. In other embodiments, the first rocking bar 61 alone or the second rocking bar 62 alone may be arranged between the first sliding element 20 and the second sliding element 40.

Furthermore, the first elastic element 50 is a torsion spring. An end of the first elastic element 50 is fixed to the first rocking bar 61, and another end is fixed to the second rocking bar 62. In the embodiment, the first elastic element 50 is formed by a bent iron wire, and the first elastic element 50 includes a first force arm 51 (see FIG. 4) and a second force arm 52 (see FIG. 5). An included angle between the first force arm 51 and the second force arm 52 is an acute angle. The first force arm 51 is fixed to the first rocking arm 61 and adjacent to the first rotation end 611. The second force arm 52 is fixed to the second rocking bar 62 and adjacent to the second rotation end 621. Certainly, in other embodiments, if the first elastic element 50 is a rectangular spring, an end of the first elastic element 50 also can be fixed to the first rotation shaft 221, and another end is fixed to the second rotation shaft 401.

Furthermore, the first guiding mechanism 10a includes a second elastic element 15. The second elastic element 15 is connected between the first sliding element 20 and the first panel 10 for providing a propelling force to the first sliding element 20 sliding to the first position or the second position.

In the embodiment, the connecting portion 21 of the first sliding element 20 defines an aperture 31a. A bottom end of the aperture 31a, is fixedly connected to an end of the second elastic element 15, and another end of the second elastic element 15 is fixed in the first sliding slot 14. By means of the aperture 31a, it is convenient to receive the second elastic element 15. Two such second elastic elements 15 are connected between the connecting portion 21 and the first panel 10. The second elastic elements 15 are irregular springs. The second elastic elements 15 extend along an "S" curve. An end of each of the two second elastic elements 15 is fixed to the bottom end of the aperture 31a, and the other ends of the two second elastic elements 15 are fixed to the two first slide guiding strips 10b respectively. When the connecting portion 21 of the first sliding element 20 gets close to the first inner side surface 11, under the force of the second elastic elements 15, the supporting portion of the first sliding element 20 is automatically slid out of the first sliding slot 14, i.e., under the effect of the elastic force of the second elastic elements 15, the first sliding element 20 is automatically slid to the second position, so that the first panel 10 is unfolded with respect to the second panel 20. When the connecting portion 21 of the first sliding element 20 gets close to the first outer side surface 12, under the force of the second elastic elements 15, the supporting portion 22 of the first sliding element 20 is automatically slid to the first sliding slot 14, i.e., the first sliding element 20 is automatically slid to the first position, so that the first panel 10 is overlapped with the second panel 20. In other embodiments, the second elastic elements also may be rectangular springs.

Furthermore, the second guiding mechanism 20a includes a third elastic element 45. The third elastic element 45 is connected between the second panel 20 and the second sliding element 40, and the third elastic element 45 is configured to provide a propelling force to the second sliding element 40 sliding to the third position or the fourth position.

In the embodiment, the third elastic element 45 is a torsion spring, and two such third elastic elements 45 are connected between the second sliding element 40 and the second panel 30. An end of each of the two third elastic elements 45 is fixed to the second sliding element 30, and other ends of the two third elastic elements 45 are fixed to the two second slide guiding strips 40b respectively. When the second sliding element 40 gets close to the second inner side surface 31, under the force of the third elastic elements 45, the second sliding element 40 automatically gets close to the second inner side surface 31, so that the first panel 10 is automatically unfolded with respect to the second panel 30. When the second sliding element 40 gets close to the second outer side surface 32, under the force of the third elastic elements 45, the second sliding element 40 automatically gets close to the second outer side surface 32, so that the first panel 10 is automatically overlapped with the second panel 30. In other embodiments, the third elastic elements also may be rectangular springs.

Figure 10:
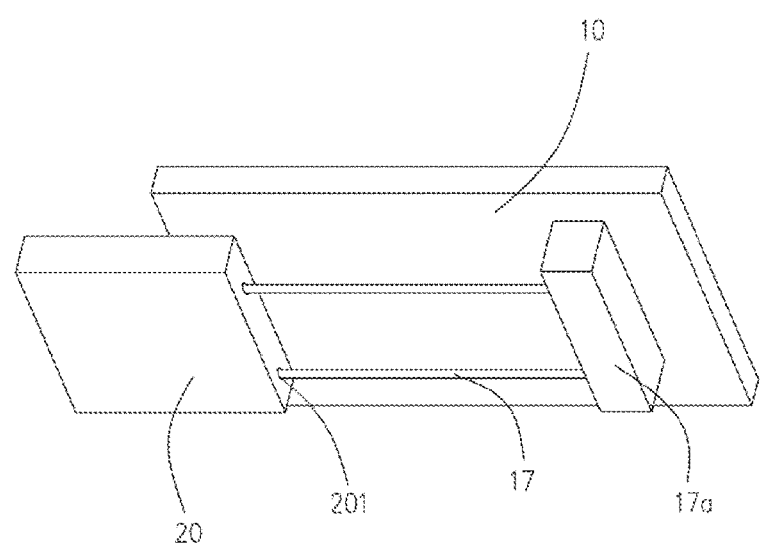
FIG. 10 is a schematic view of a first guiding mechanism of a flexible extension structure of a second embodiment.

Furthermore, referring to FIG. 1 and FIG. 10, a second embodiment is provided. The second embodiment is substantially the same as the first embodiment, it is different in that the first guiding mechanism 10a includes two first sliding rods 17 arranged side by side. The two first sliding rods 17 extend along a direction parallel to the first panel 10. Ends of the first sliding rods 17 are fixed to a first boss 17a provided on a side of the first panel 10 facing away from the first upper surface 13. The first sliding element 20 defines two parallel insertion holes 201. The first sliding rods 17 are inserted into the insertion slots 201 respectively, so that the first sliding element 20 is slid along the first sliding rods 17. When the first sliding element 20 gets close to the first boss 17a, the first sliding element 20 is at least partially overlapped with the first panel 10. i.e., the first sliding element 20 is slid to the first position. When the first sliding element 20 gets away from the first boss 17a, the first sliding element 20 is at least partially misaligned with respect to the first panel 10, i.e., the first sliding element is slid to the second position.

In the embodiment, the arrangement of the second guiding mechanism 20a is the same as that of the first guiding mechanism 10a, which will not be repeated herein.

Figure 11:
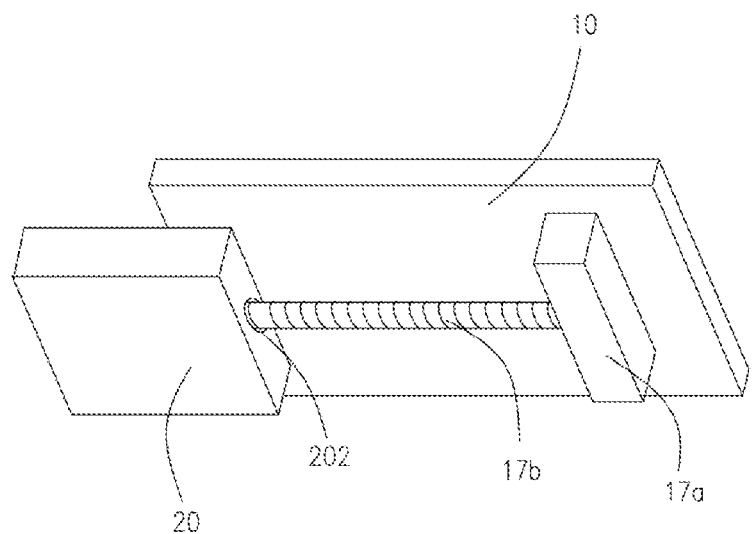
FIG. 11 is a schematic view of a first guiding mechanism of a flexible extension structure of a third embodiment.
Figure 12:
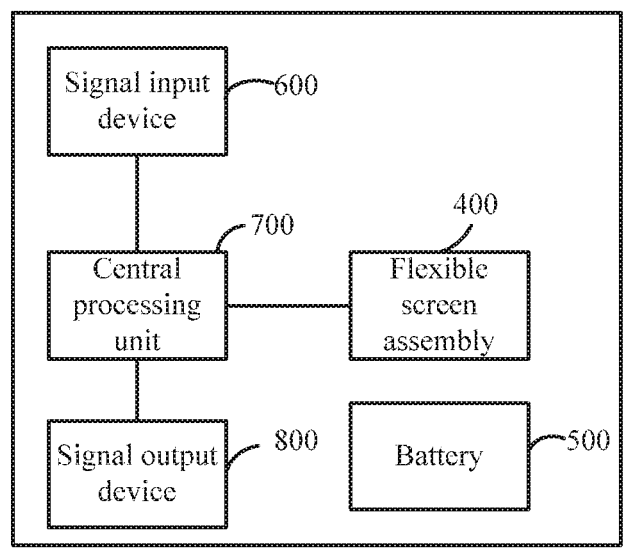
FIG. 12 is a block diagram of a terminal according to an embodiment of the present disclosure.

Furthermore, referring to FIG. 1 and FIG. 11, a third embodiment is provided. The third embodiment is substantially the same as the first embodiment, and it is different in that the first guiding mechanism 10a includes a first screw rod 17b and a first driver (not shown). The first screw rod 17h extends along a direction parallel to the first panel 10. The first screw rod 17b is rotatable connected to the first panel 10. The first driver drives the first screw rod 17b to rotate. The first sliding element 20 defines a first threaded hole 202. The first threaded hole 202 and the first screw rod 17h are in threaded connection. The first driver drives the first screw rod 17h to rotate clockwise or anticlockwise, realizing sliding of the first sliding element 20 with respect to the first panel 10, so that sliding of the first sliding element 20 to the first position or the second position can be realized.

In the embodiment, the arrangement of the second guiding mechanism 20a is the same as that of the first guiding mechanism 10a, which will not be repeated herein.

The present disclosure further provides a flexible screen assembly (not shown). The flexible screen assembly includes the flexible screen extension structure 100. The flexible screen assembly further includes a flexible screen (not shown). The flexible screen includes a first edge (not shown), and a second edge (not shown) arranged opposite to the first edge. The first edge is fixed to the first outer side surface 12. The second edge is fixed to the second outer side surface 32. Thus, when the first panel 10 is unfolded with respect to the second panel 30, a display surface of the flexible screen is unfolded, thereby increasing the display size. When the first panel 10 is folded with respect to the second panel 30, the display surface of the flexible screen is folded, thereby reducing the display size, and realizing portability.

The present disclosure further provides a terminal. The terminal includes a flexible screen assembly 400, a battery 500, a signal input device 600, a central processing unit 700, and a signal output device 800. The flexible screen assembly 400 is substantially the same as the above described flexible screen assembly. All of the battery 500, the signal input device 600, the central processing unit 700, and, the signal output device 800 are mounted in the flexible screen assembly. The signal input device 600 is electrically coupled to the central processing unit 700 for receiving a signal and transmitting the signal to the central processing unit 700. The flexible screen assembly 400 is electrically coupled to the central processing unit 700 for acquiring a signal from the central processing unit 700 and outputting the signal. The central processing unit 700 is configured to acquire a signal from the signal input device 600, process the signal, and transmit the processed signal to the signal output device 800. The battery 500 supplies power to the central processing unit 700, the flexible screen assembly 400, and the signal input device 600.

In the embodiment, the terminal is a mobile phone. After acquiring an instruction signal from the central processing unit 700, the flexible screen assembly 400 outputs an image signal. The signal input device 600 may be a virtual key, and also may be a physical key. When a user operates the signal input device to input an instruction to the signal input device 600, the signal input device 600 inputs an instruction signal to the central processing unit 700. The central processing unit 700 performs operation processing based on the instruction signal, thereby realizing various functions of the terminal. Certainly, in other embodiments, the terminal also may be a Bluetooth-enabled speaker, or a tablet computer, the signal input device may be a Bluetooth receiver, and the signal output device 800 also may be a trumpet.

For the flexible screen extension structure, the flexible screen assembly, and the terminal of the present disclosure, by means of that the supporting portion can get away from the second sliding element, and can be slid into the first sliding slot, the first panel can be stacked on the second panel, thereby realizing reduction of the size of the display device, and realizing portability. By means of that the supporting portion can approach the second sliding element, and can be slid out of the first sliding slot, the first panel can be flush with the second panel, thereby increasing the size of the display device, and realizing increase of the display size.

The above-mentioned are merely for preferable embodiments of the present disclosure. It shall be indicated that a person ordinarily skilled in the art still can make some improvements and modifications within the principle of the present disclosure, and these improvements and modifications also shall be considered as the protection scope of the present disclosure.

What is claimed is:
1. A flexible screen extension structure, comprising:
a first panel comprising a first guiding mechanism;
a first sliding element slidably connected to the first guiding mechanism along a first direction, wherein under the guide of the first guiding mechanism, the first sliding element is slidable to a first position where the first sliding element is overlapped with the first panel, and to a second position where the first sliding element is at least partially misaligned with respect to the first panel;
a second panel comprising a second guiding mechanism;

a second sliding element slidably connected to the second guiding mechanism along a second direction, wherein under the guide of the second guiding mechanism, the second sliding element is slidable to a third position where the second sliding element is adjacent to the first panel, and to a fourth position where the second sliding element is far away from the first panel, and the second direction is parallel to the first direction; and a first elastic element arranged between the first sliding element and the second sliding element;

wherein, when the first sliding element is located in the first position and the second sliding element is located in the fourth position, the first panel and the second panel are overlapped with each other, and the first elastic element provides an elastic force to cause the first sliding element and the second sliding element to get close to each other in a direction from the first panel towards the second panel; when the first sliding element is located in the second position and the second sliding element is located in the third position, the first panel and the second panel are kept side by side under the effect of the elastic force.

2. The flexible screen extension structure of claim 1, wherein the first panel comprises a first inner side surface, and a first outer side surface arranged opposite to the first inner side surface, when the first sliding element is slid to the first position, the first sliding element is located between the first inner side surface and the first outer side surface, and when the first sliding element is slid to the second position, at least a part of the first sliding element is located at a side of the first inner side surface facing away from the first outer side surface;

the second panel comprises a second inner side surface, and a second outer side surface arranged opposite to the second inner side surface, the third position and the fourth position are provided between the second inner side surface and the second outer side surface, the third position is adjacent to the second inner side surface, and the fourth position is adjacent to the second outer side surface.

3. The flexible screen extension structure of claim 2, wherein the first guiding mechanism defines a first sliding slot, the first sliding slot extends along a direction from the first inner side surface towards the first outer side surface, and the first sliding element is slidably connected to the first sliding slot; the second guiding mechanism defines a second sliding slot, the second sliding slot extends along a direction from the second inner side surface towards the second outer side surface, and the second sliding element is slidably connected to the second sliding slot.

4. The flexible screen extension structure of claim 3, wherein the first panel comprises a first upper surface, the first upper surface is arranged between the first inner side surface and the first outer side surface; the second panel comprises a second upper surface, the second upper surface is arranged between the second inner side surface and the second outer side surface, when the first panel and the second panel are arranged side by side, the first upper surface is flush with the second upper surface.

5. The flexible screen extension structure of claim 4, wherein an included angle between the first inner side surface and the first upper surface is an obtuse angle, the second inner side surface is parallel to the first inner side surface, the second inner side surface is operable to abut against the first inner side surface, and the second inner side surface and the first inner side surface are slidable in relation to each other to cause the first upper surface to be flush with the second upper surface.

6. The flexible screen extension structure of claim 4, wherein the first panel further comprises a first bottom surface arranged opposite to the first upper surface, the second panel further comprises a second bottom surface arranged opposite to the second upper surface, the second bottom surface defines a groove, the first sliding element is at least partially slid out of the first sliding slot, and is received in the groove, the first upper surface is flush with the second upper surface, and the first bottom surface is flush with the second bottom surface.

7. The flexible screen extension structure of claim 1, wherein the first panel defines a first guiding slot, the first guiding slot extends along a direction parallel to the first panel, an end of the first elastic element adjacent to the first sliding element is slidably connected to the first guiding slot, the second panel defines a second guiding slot, the second guiding slot extends along a direction parallel to the second panel, an end of the first elastic element adjacent to the second sliding element is slidably connected to the second guiding slot.

8. The flexible screen extension structure of claim 1, wherein the flexible screen extension structure comprises a third guiding mechanism, the third guiding mechanism is connected between the first sliding element and the second sliding element, so as to cause the first sliding element and the second sliding element to slid in relation to each other in a direction perpendicular to the first panel.

9. The flexible screen extension structure of claim 8, wherein the third guiding mechanism comprises a first rocking bar, the first rocking bar comprises a first rotation end, and a first sliding end arranged opposite to the first rotation end, the first rotation end is rotatably connected to the first sliding element, the first sliding end is slidably connected to the second sliding element, a rotation surface of the first rocking bar is parallel to a direction in which the first sliding element gets close to the second sliding element.

10. The flexible screen extension structure of claim 8, wherein the third guiding mechanism comprises a second rocking bar, the second rocking bar comprises a second rotation end, and a second sliding end arranged opposite to the second rotation end, the second rotation end is rotatably connected to the second sliding element, the second sliding end is slidably connected to the first sliding element, a rotation surface of the second rocking bar is parallel to a direction in which the second sliding element gets close to the first sliding element.

11. The flexible screen extension structure of claim 1, wherein the first guiding mechanism comprises a second elastic element, the second elastic element is connected between the first sliding element and the first panel, and provides a propelling force to the first sliding element sliding to the first position or the second position.

12. The flexible screen extension structure of claim 1, wherein the second guiding mechanism comprises a third elastic element, the third elastic element is connected between the second panel and the second sliding element, and provides a propelling force to the second sliding element sliding to the third position or the fourth position.

13. The flexible screen extension structure of claim 1, wherein the first elastic element is a torsion spring.

14. A flexible screen assembly, comprising:
a flexible screen extension structure, comprising:
a first panel comprising a first guiding mechanism;

a first sliding element slidably connected to the first guiding mechanism along a first direction, wherein under the guide of the first guiding mechanism, the first sliding element is slidable to a first position where the first sliding element is overlapped with the first panel, and to a second position where the first sliding element is at least partially misaligned with respect to the first panel;

a second panel comprising a second guiding mechanism;

a second sliding element slidably connected to the second guiding mechanism along a second direction, wherein under the guide of the second guiding mechanism, the second sliding element is slidable to a third position where the second sliding element is adjacent to the first panel, and to a fourth position where the second sliding element is far away from the first panel, and the second direction is parallel to the first direction; and a first elastic element arranged between the first sliding element and the second sliding element;

wherein, when the first sliding element is located in the first position and the second sliding element is located in the fourth position, the first panel and the second panel are overlapped with each other, and the first elastic element provides an elastic force to cause the first sliding element and the second sliding element to get close to each other in a direction from the first panel towards the second panel; when the first sliding element is located in the second position and the second sliding element is located in the third position, the first panel and the second panel are kept side by side under the effect of the elastic force.

15. A terminal, wherein the terminal comprises a flexible screen assembly of claim 14, and the terminal further comprises: a battery, a signal input device, and a central processing unit, all of the battery, the signal input device, and the central processing unit are mounted in the flexible screen assembly, the signal input device is electrically coupled to the central processing unit for receiving a signal and transmitting the signal to the central processing unit, the flexible screen assembly is electrically coupled to the central processing unit for acquiring a signal from the central processing unit and outputting the signal, the central processing unit is configured to acquire a signal from the signal input device, process the signal, and transmit the processed signal to a signal output device, and the battery supplies power to the central processing unit, the flexible screen assembly, and the signal input device.

16. The flexible screen assembly of claim 14, wherein the first panel comprises a first inner side surface, and a first outer side surface arranged opposite to the first inner side surface, when the first sliding element is slid to the first position, the first sliding element is located between the first inner side surface and the first outer side surface, and when the first sliding element is slid to the second position, at least a part of the first sliding element is located at a side of the first inner side surface facing away from the first outer side surface;

the second panel comprises a second inner side surface, and a second outer side surface arranged opposite to the second inner side surface, the third position and the fourth position are provided between the second inner side surface and the second outer side surface, the third position is adjacent to the second inner side surface, and the fourth position is adjacent to the second outer side surface.

17. The flexible screen assembly of claim 16, wherein the first guiding mechanism defines a first sliding slot, the first sliding slot extends along a direction from the first inner side surface towards the first outer side surface, and the first sliding element is slidably connected to the first sliding slot; the second guiding mechanism defines a second sliding slot, the second sliding slot extends along a direction from the second inner side surface towards the second outer side surface, and the second sliding element is slidably connected to the second sliding slot.

18. The flexible screen assembly of claim 17, wherein the first panel comprises a first upper surface, the first upper surface is arranged between the first inner side surface and the first outer side surface; the second panel comprises a second upper surface, the second upper surface is arranged between the second inner side surface and the second outer side surface, when the first panel and the second panel are arranged side by side, the first upper surface is flush with the second upper surface.

19. The flexible screen assembly of claim 18, wherein an included angle between the first inner side surface and the first upper surface is an obtuse angle, the second inner side surface is parallel to the first inner side surface, the second inner side surface is operable to abut against the first inner side surface, and the second inner side surface and the first inner side surface are slidable in relation to each other to cause the first upper surface to be flush with the second upper surface.

20. The flexible screen assembly of claim 18, wherein the first panel further comprises a first bottom surface arranged opposite to the first upper surface, the second panel further comprises a second bottom surface arranged opposite to the second upper surface, the second bottom surface defines a groove, the first sliding element is at least partially slid out of the first sliding slot, and is received in the groove, the first upper surface is flush with the second upper surface, and the first bottom surface is flush with the second bottom surface.

* * * * *